United States Patent
Kobayashi

(10) Patent No.: US 10,971,040 B2
(45) Date of Patent: Apr. 6, 2021

(54) DISPLAY DEVICE AND METHOD FOR CONTROLLING DISPLAY DEVICE

(71) Applicant: SEIKO EPSON CORPORATION, Tokyo (JP)

(72) Inventor: Makoto Kobayashi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/513,773

(22) Filed: Jul. 17, 2019

(65) Prior Publication Data

US 2020/0027377 A1   Jan. 23, 2020

(30) Foreign Application Priority Data

Jul. 18, 2018   (JP) .............................. JP2018-134889

(51) Int. Cl.
| | |
|---|---|
| G09G 3/00 | (2006.01) |
| H04N 9/31 | (2006.01) |
| G09G 3/36 | (2006.01) |
| G09G 3/34 | (2006.01) |
| G02F 1/13357 | (2006.01) |

(52) U.S. Cl.
CPC ............ *G09G 3/001* (2013.01); *G02F 1/1336* (2013.01); *G09G 3/3413* (2013.01); *G09G 3/36* (2013.01); *H04N 9/3155* (2013.01); *G09G 2320/046* (2013.01)

(58) Field of Classification Search
CPC ........ G09G 3/001; G09G 3/36; G09G 3/3413; G09G 2320/046; G09G 2330/021; G09G 2320/048; G09G 3/3406; G09G 2320/0257; G09G 2320/0295; H04N 9/3155; H04N 9/3194; H04N 9/3182; G02F 1/1336

See application file for complete search history.

(56) References Cited

U.S. PATENT DOCUMENTS

| | | | |
|---|---|---|---|
| 9,102,776 B1* | 8/2015 | Kostrzewa | C08F 265/04 |
| 2007/0136566 A1* | 6/2007 | Oshima | G06F 1/3203 |
| | | | 713/1 |
| 2017/0127028 A1* | 5/2017 | Oike | H04N 9/3147 |
| 2017/0142379 A1* | 5/2017 | Kihara | H04N 9/3179 |
| 2018/0075806 A1* | 3/2018 | Yamazaki | G09G 3/3233 |
| 2018/0350296 A1* | 12/2018 | Thompson | G06F 3/0644 |

FOREIGN PATENT DOCUMENTS

| | | | |
|---|---|---|---|
| JP | 2009-139471 A | | 6/2009 |
| JP | 2009139471 A | * | 6/2009 |
| JP | 2009-239598 A | | 10/2009 |
| JP | 2017-130879 A | | 7/2017 |

* cited by examiner

*Primary Examiner* — Premal R Patel
(74) *Attorney, Agent, or Firm* — Oliff PLC

(57) ABSTRACT

A projector includes: a projection unit having a light modulation device and projecting a projection image via the light modulation device; an image pickup unit picking up the projection image projected by the projection unit and generating picked-up image data; a decision unit deciding a first elimination execution time for which an elimination function to eliminate burn-in on the light modulation device is executed, based on the picked-up image data; and a processing unit executing the elimination function during the first elimination execution time decided by the decision unit.

6 Claims, 2 Drawing Sheets

DISPLAY DEVICE AND METHOD FOR CONTROLLING DISPLAY DEVICE

The present application is based on, and claims priority from JP Application Serial Number 2018-134889, filed Jul. 18, 2018, the disclosure of which is hereby incorporated by reference herein in its entirety.

BACKGROUND

1. Technical Field

The present invention relates to a display device and a method for controlling a display device.

2. Related Art

According to the related art, a technique for eliminating burn-in on a device which displays an image is known. JP-A-2017-130879 is an example of the related art. JP-A-2017-130879 discloses a technique for eliminating burn-in by displaying a gray image for a predetermined time in the state where the backlight of a liquid crystal panel is switched off, thus uniformly driving a liquid crystal element of the liquid crystal panel, and subsequently stopping the driving of the liquid crystal panel.

In the configuration disclosed in JP-A-2017-130879, the time for which the gray image is displayed is predetermined. Therefore, burn-in may not be sufficiently eliminated, depending on the state of the burn-in. Also, the gray image may be displayed for an unnecessarily long time.

SUMMARY

An advantage of some aspects of the disclosure is to optimize the time for which the function to eliminate burn-in is executed in a display device.

A display device according to an aspect of the disclosure includes: a display unit having an electro-optical device and displaying an image via the electro-optical device; an image pickup unit picking up the image displayed by the display unit and generating picked-up image data; a decision unit deciding a first time period for which an elimination function to eliminate burn-in on the electro-optical device is executed, based on the picked-up image data; and a processing unit executing the elimination function during the first time period decided by the decision unit.

In the display device, the decision unit may determine whether the burn-in on the electro-optical device is eliminated by the execution of the elimination function or not. When it is determined that the burn-in on the electro-optical device is eliminated, the processing unit may end the execution of the elimination function even before the first time period passes after the execution of the elimination function is started.

In the display device, the decision unit may determine whether the burn-in on the electro-optical device is eliminated or not, when a second time period shorter than the first time period has passed after the processing unit starts the execution of the elimination function.

In the display device, the decision unit may cause the image pickup unit to pick up the image and may decide a third time period shorter than the first time period, based on the picked-up image data, when it is determined that the burn-in on the electro-optical device is not eliminated. After deciding the third time period, the decision unit may determine whether the burn-in on the electro-optical device is eliminated or not, when a fourth time period shorter than the third time period has passed after the processing unit resumes the execution of the elimination function and a total time of the second time period and the fourth time period is shorter than the first time period.

In the display device, the processing unit may end the execution of the elimination function, when the fourth time period has passed after the execution of the elimination function is resumed and a total time for which the elimination function is executed is equal to or longer than the first time period.

In the display device, the processing unit may execute the elimination function at a preset timing.

A method for controlling a display device according to another aspect of the disclosure is a method for controlling a display device which has a display unit having an electro-optical device and displaying an image via the electro-optical device and an image pickup unit picking up the image displayed by the display unit and generating picked-up image data, includes: deciding a first time period for which an elimination function to eliminate burn-in on the electro-optical device is executed, based on the picked-up image data; and executing the elimination function during the first time period thus decided.

DESCRIPTION OF EXEMPLARY EMBODIMENTS

Figure 1:
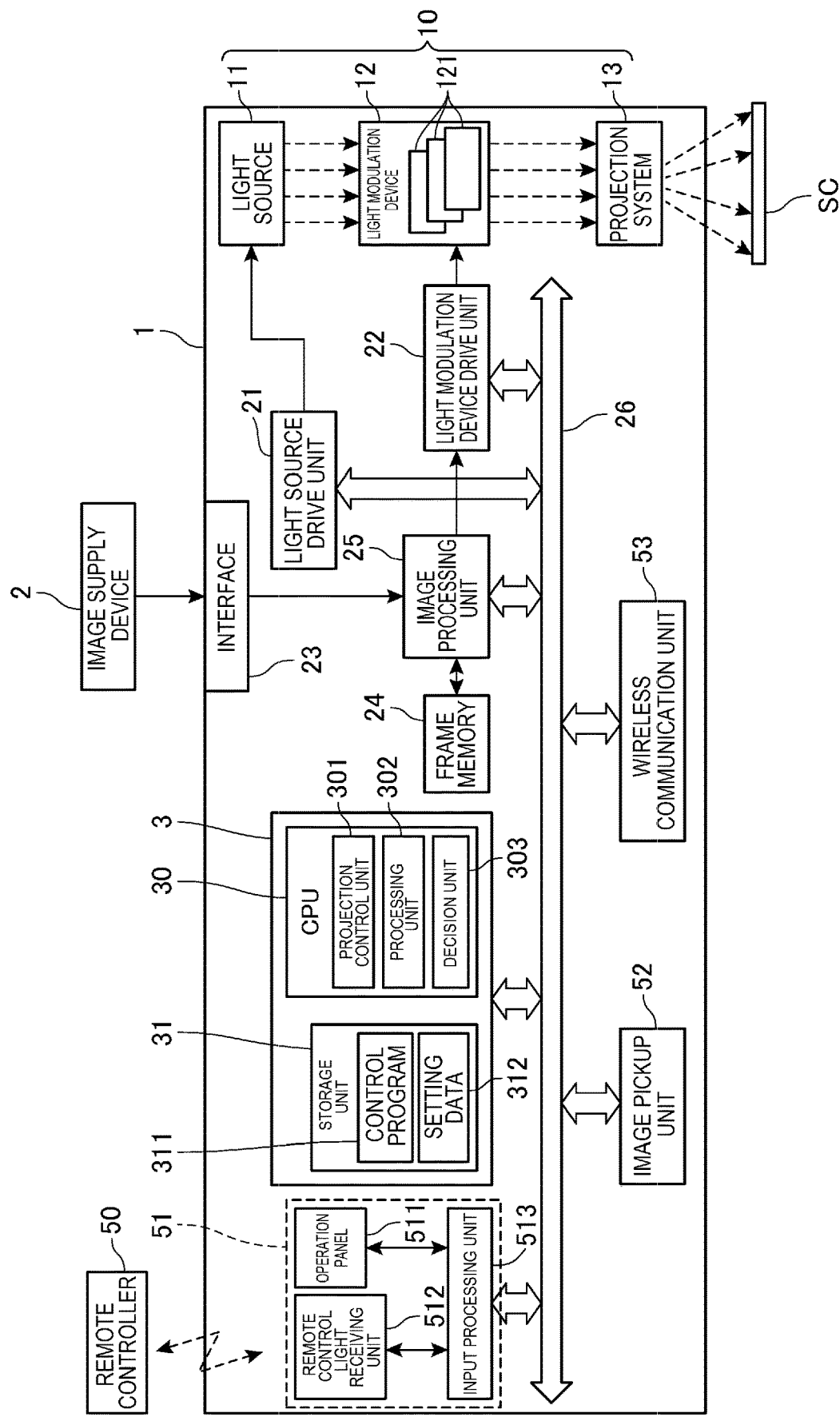
FIG. 1 is a block diagram showing the configuration of a projector.

FIG. 1 is a block diagram showing the configuration of a projector 1 as an embodiment example of the display device according to the disclosure.

An image supply device 2 as an external device is coupled to the projector 1. The image supply device 2 outputs image data to the projector 1. The projector 1 projects a projection image onto a screen SC as a projection surface, based on the image data inputted from the image supply device 2. The projection of the projection image by the projector 1 is an example of displaying an image by the display device.

The image data inputted from the image supply device 2 is image data conforming to a predetermined standard. The image data may be still image data or dynamic image data and may include audio data.

The image supply device 2 is a so-called image source which outputs image data to the projector 1. The image supply device 2 is not limited to a specific configuration and may be an apparatus that can be coupled to the projector 1 and that can output image data to the projector 1. For example, a disk-type recording medium playback device, television tuner device, or personal computer may be used.

The screen SC may be a curtain-like screen. Also, a wall surface of a building, or a plane surface of an installation may be used as the screen SC. The screen SC is not limited to a plane surface and may be a curved surface or a surface with irregularities.

The projector 1 has a control unit 3 which controls each part of the projector 1, and a projection unit 10 which projects a projection image. The projection unit 10 is equivalent to the display unit according to the disclosure. The control unit 3 includes a CPU 30 and a storage unit 31 or the like. The storage unit 31 is a storage device which stores a control program 311 executed by the CPU 30 and data in a non-volatile manner. The storage unit 31 includes a semiconductor storage element or the like, such as a flash ROM. The storage unit 31 may include a RAM forming a work area for the CPU 30.

The CPU 30 executes the control program 311 of the projector 1 stored in the storage unit 31 and thus functions as a projection control unit 301, a processing unit 302, and a decision unit 303. These functional blocks are implemented by a collaboration of software and hardware as the CPU 30 executes the control program 311.

The storage unit 31 stores setting data 312 in addition to the control program 311. The setting data 312 includes a set value about an operation of the projector 1. The set value included in the setting data 312 is, for example, the content of processing executed by an image processing unit 25, a parameter used for processing by the image processing unit 25, and the like. The storage unit 31 may also store other programs and data.

The projection unit 10 has a light source 11, alight modulation device 12, and a projection system 13. The light modulation device 12 is equivalent to the electro-optical device according to the disclosure.

The light source 11 includes a lamp such as a halogen lamp, xenon lamp or ultra-high-pressure mercury lamp, or a solid-state light source such as an LED or laser light source. The light source 11 turns on with electric power supplied from a light source drive unit 21 and emits light toward the light modulation device 12.

The light source drive unit 21 supplies a drive current or pulse to the light source 11 under the control of the control unit 3 and thus causes the light source 11 to emit light.

The light modulation device 12 has three liquid crystal panels 121 corresponding to the primary colors of RGB. The light emitted from the light source 11 is separated into color light components of the three colors of RGB by a dichroic mirror, a reflection mirror, a relay lens and the like, and becomes incident on the liquid crystal panels 121 of the corresponding colors. Each liquid crystal panel 121 has a pair of transparent substrates with a liquid crystal enclosed between them. Each liquid crystal panel 121 has a rectangular pixel area where a plurality of pixels are arrayed into a matrix. A drive voltage is applied to the liquid crystal at each pixel by a light modulation device drive unit 22.

To the light modulation device drive unit 22, image data separated into the primary colors of R, G, and B is inputted from the image processing unit 25, described later. The light modulation device drive unit 22 converts the inputted image data of each color into a data signal suitable for the operation of the corresponding liquid crystal panel 121. The light modulation device drive unit 22 applies a drive voltage corresponding to the converted data signal, to the liquid crystal panel 121 at each pixel, and thus causes an image to be drawn frame by frame on each liquid crystal panel 121. The light emitted from the light source 11 is thus modulated into image light by the light modulation device 12.

The projection system 13 has an optical element such as a lens and a mirror. The projection system 13 causes the light modulated by the light modulation device 12 to form an image on the screen SC and thus projects a projection image.

The projector 1 has an interface 23, a frame memory 24, the image processing unit 25, an operation unit 51, an image pickup unit 52, and a wireless communication unit 53. These units are coupled to the control unit 3 via a bus 26 in such a way as to be able to communicate data.

The interface 23 is a wired interface for data communication and has a connector and an interface circuit or the like conforming to a predetermined communication standard. In FIG. 1, the connector and the interface circuit are not illustrated. The interface 23 is coupled to the image supply device 2 via a cable and transmits and receives image data and control data or the like to and from an external device, under the control of the control unit 3. As the interface 23, various communication interfaces and image input interfaces can be employed.

The frame memory 24 has a plurality of banks. Each bank has a storage capacity to be able to write one frame of image data. The frame memory 24 includes, for example, an SDRAM. SDRAM is the abbreviation for synchronous dynamic random access memory.

The image processing unit 25 performs image processing such as resolution conversion or resizing, distortion correction, shape correction, digital zoom, or adjustment of the color tone and luminance of the image, onto the image data loaded in the frame memory 24. The image processing unit 25 executes processing designated by the control unit 3 and performs processing using a parameter inputted from the control unit 3 according to need. The image processing unit 25 can also execute a combination of a plurality of types of image processing, of the foregoing types.

The image processing unit 25 reads out the processed image data from the frame memory 24 and outputs the processed image data to the light modulation device drive unit 22.

The operation unit 51 has an operation panel 511, a remote control light receiving unit 512, and an input processing unit 513.

The operation panel 511 is provided on the casing of the projector 1 and has various switches that the user can operate. The input processing unit 513 detects an operation of each switch on the operation panel 511.

The remote control light receiving unit 512 receives an infrared signal transmitted from a remote controller 50. The input processing unit 513 decodes the signal received by the remote control light receiving unit 512, generates operation data, and outputs the operation data to the control unit 3.

The input processing unit 513 is coupled to the operation panel 511 and the remote control light receiving unit 512. When the operation panel 511 or the remote control light receiving unit 512 accepts an operation by the user, the input processing unit 513 generates operation data corresponding to the accepted operation and outputs the operation data to the control unit 3.

The image pickup unit 52 has an image pickup optical system, an image pickup element such as a CCD or CMOS, and an interface circuit. CCD is the abbreviation of charge-coupled device. CMOS is the abbreviation of complementary MOS. The image pickup unit 52 picks up an image in the direction of projection of the projection system 13 under the control of the control unit 3. The pickup range, that is, the angle of view of the image pickup unit 52 is a range including the screen SC and its peripheries. The image pickup unit 52 outputs picked-up image data to the control unit 3.

The wireless communication unit 53 has an antenna and an RF circuit or the like, not illustrated, and executes wireless data communication with an external device, under the control of the control unit 3. The wireless communication unit 53 executes wireless communication, for example, based on wireless LAN or Bluetooth. Bluetooth is a trademark registered.

The functional blocks of the CPU 30 will now be described.

The projection control unit 301 controls the light source drive unit 21 and the light modulation device drive unit 22, causes the light source drive unit 21 to turn on the light source 11, causes the light modulation device drive unit 22 to drive the light modulation device 12, and thus causes the projection unit 10 to project a projection image. The projection control unit 301 also controls the image processing unit 25 to execute image processing on the image data inputted to the interface 23 and to output the processed image data to the light modulation device drive unit 22.

The processing unit 302 executes an elimination function to eliminate burn-in on each liquid crystal panel 121. The burn-in on the liquid crystal panel 121 is an after-image generated by uneven distribution of liquid crystal molecules in the liquid crystal or uneven distribution of ionic impurities in the liquid crystal due to a movement of liquid crystal molecules, and occurs pixel by pixel in the liquid crystal panel 121. The burn-in on the liquid crystal panel 121 tends to occur when the same projection image is projected for a long time. As the projection time becomes longer, the degree of unevenness of distribution increases, resulting in darker burn-in over a broader range. When burn-in occurs on the liquid crystal panel 121, modulation corresponding to the applied drive voltage does not take place at the site of burn-in, and unevenness occurs in the projection image at a site corresponding to the site of burn-in. The processing unit 302 executes the elimination function and thus causes the projection control unit 301 to project a totally black projection image, a totally white projection image, a projection image which changes with the lapse of time like a screen saver, or the like. Thus, the processing unit 302 eliminates the uneven distribution of liquid crystal molecules or ionic impurities and eliminates the burn-in on the liquid crystal panel 121.

In the description below, the burn-in on the liquid crystal panel 121 is referred to as burn-in on the light modulation device 12.

The decision unit 303 decides an elimination execution time for which the processing unit 302 executes the elimination function, based on the picked-up image data picked up by the image pickup unit 52. A method for deciding the elimination execution time by the decision unit 303 will be described later.

An operation of the projector 1 will now be described.

Figure 2:
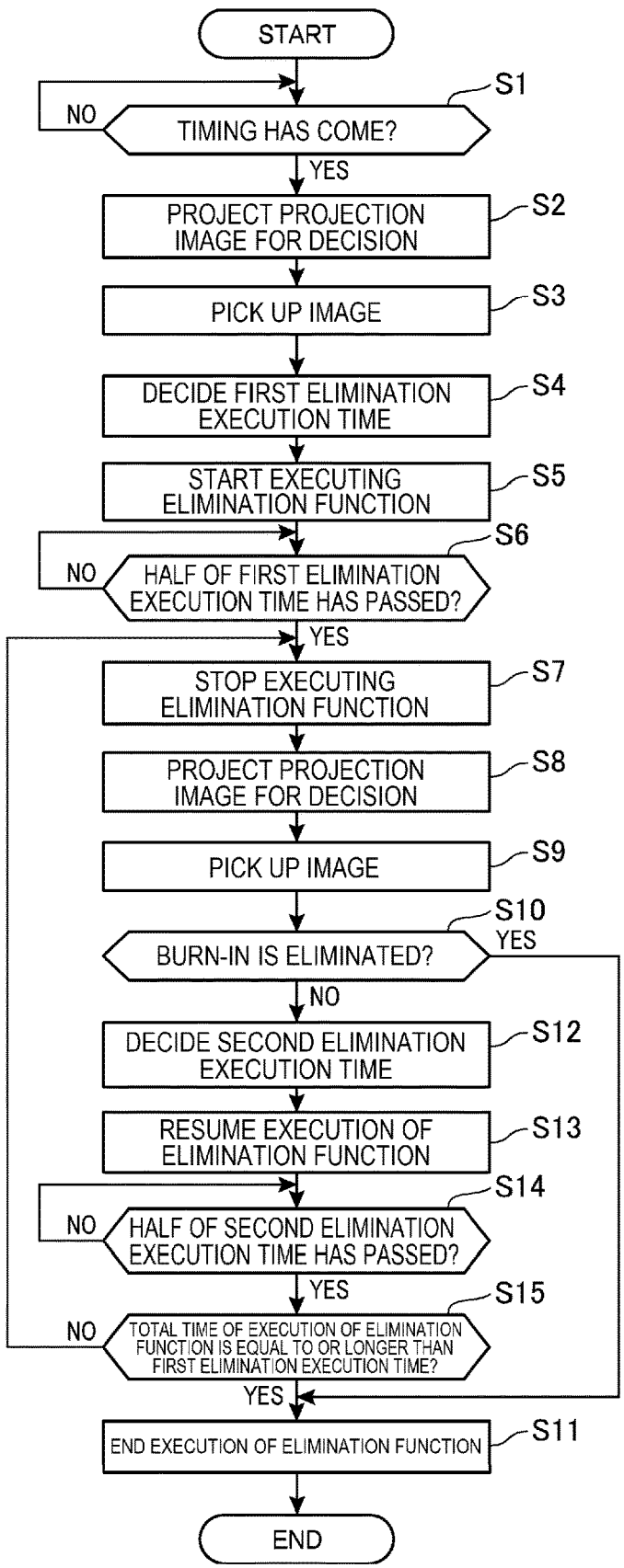
FIG. 2 is a flowchart showing an operation of the projector.

FIG. 2 is a flowchart showing an operation of the projector 1.

The processing unit 302 of the control unit 3 of the projector 1 determines whether a timing to start executing the elimination function has come or not (step S1). For example, the processing unit 302 measures the current time and determines that a timing to start executing the elimination function has come when predetermined time has come. The processing unit 302 acquires the current time and date from an RTC, not illustrated, at the startup of the projector 1, then adds the time period from the startup measured by a timer function to the acquired current time and date, and thus measures the current time. RTC is the abbreviation of real time clock.

When the processing unit 302 determines that a timing to start executing the elimination function has come (YES in step S1), the projection control unit 301 causes the projection unit 10 to project a projection image for deciding an elimination execution time (step S2). The projection image for deciding an elimination execution time is hereinafter referred to as a "projection image for decision". The projection image for decision is, for example, an image in which all the pixels are in the same achromatic color. Specifically, the projection image for decision is an entirely white image or an entirely gray image.

Next, after the projection control unit 301 causes the projection unit 10 to project the projection image for decision, the decision unit 303 causes the image pickup unit 52 to pick up the projection image for decision projected on screen SC (step S3).

Next, the decision unit 303 decides a first elimination execution time based on the picked-up image data picked up by the image pickup unit 52 in step S3 (step S4). The first elimination execution time is a maximum elimination execution time for which the processing unit 302 can execute the elimination function. The first elimination execution time is equivalent to the first time period according to the disclosure. A method for deciding the first elimination execution time will now be described, using a plurality of examples.

Example 1

The decision unit 303 specifies a pixel having a different gradation value from a predetermined reference value, based on the picked-up image data, and decides the first elimination execution time according to the number of pixels thus specified. The reference value is, for example, an average gradation value of pixels in the picked-up image data of the projection image for decision projected when there is no burn-in on the liquid crystal panel 121. The reference value is defined by an advance test, simulation or the like and stored in advance in the storage unit 31 or the like. The decision unit 303 decides the first elimination execution time in such a way that the first elimination execution time becomes longer as the number of specified pixels becomes greater. The decision unit 303 may decide the first elimination execution time, using a predetermined algorithm, or may decide the first elimination execution time, referring to a database establishing a correspondence between the number of specified pixels and information representing the first elimination execution time. Thus, the decision unit 303 can decide a first elimination execution time corresponding to the degree of burn-in on the light modulation device 12.

Example 2

The decision unit 303 decides the first elimination execution time according to the difference between the gradation value of a pixel having the most distant pixel value from a predetermined reference value, of pixels having a different gradation value from the reference value, and the reference value, based on the picked-up image data. The reference value is, for example, the average gradation value described in Example 1 and is defined by an advance test, simulation or the like and stored in advance in the storage unit 31 or the like. The decision unit 303 decides the first elimination execution time in such a way that the first elimination execution time becomes longer as the difference between the gradation value of the pixel having the most distant value and the reference value becomes greater. As in Example 1, the decision unit 303 may decide the first elimination execution time by computing using a predetermined algorithm, or may decide the first elimination execution time, referring to a database establishing a correspondence between information representing this difference and information representing the first elimination execution time. Thus, the decision unit 303 can decide a first elimination execution time corresponding to the degree of burn-in on the light modulation device 12. Also, since the first elimination execution time is decided corresponding to the difference between the gradation value of the pixel having the most distant value and the reference value, the decision unit 303 can decide a first elimination execution time that can sufficiently achieve a burn-in elimination effect.

After the decision unit 303 decides the first elimination execution time, the processing unit 302 starts executing the elimination function (step S5).

Next, the processing unit 302 determines whether or not a half of the first elimination execution time has passed after the execution of the elimination function is started (step S6). A half of the first elimination execution time is equivalent to the second time period according to the disclosure. When the processing unit 302 determines that a half of the first elimination execution time has not passed (NO in step S6), the processing unit 302 carries out the determination of step S6 again.

Meanwhile, when it is determined that a half of the first elimination execution time has passed (YES in step S6), the decision unit 303 stops the elimination function (step S7). Next, the projection control unit 301 causes the projection unit 10 to project a projection image for decision (step S8).

Next, the decision unit 303 causes the image pickup unit 52 to pick up the projection image for decision projected on the screen SC (step S9).

Next, the decision unit 303 determines whether the burn-in on the light modulation device 12 is eliminated or not, based on the picked-up image data picked up by the image pickup unit 52 in step S9 (step S10).

For example, the decision unit 303 determines whether the burn-in on the light modulation device 12 is eliminated or not, according to whether the number of pixels having a different gradation value from the reference value is equal to or less than a predetermined number, or not. The predetermined number is an upper limit of the number of pixels having a different gradation value from the reference value with which it can be regarded that there is no burn-in on the light modulation device 12. The predetermined number is defined in advance by an advance test, simulation or the like and stored in the storage unit 31 or the like. The decision unit 303 determines as negative in step S10 when the number of pixels having a different gradation value from the reference value is greater than the predetermined number. The decision unit 303 determines as positive in step S10 when the number of pixels having a different gradation value from the reference value is equal to or less than the predetermined number. Also, for example, the decision unit 303 determines whether or not the difference between the gradation value of a pixel having the most distant pixel value from the reference value, of the pixels having a different gradation value from the reference value, and the reference value, is equal to or less than a predetermined value, based on the picked-up image data picked up by the image pickup unit 52 in step S9. The predetermined value is an upper limit of the difference from the reference value with which it can be regarded that there is no burn-in on the light modulation device 12. The predetermined value is defined in advance by an advance test, simulation or the like and stored in the storage unit 31 or the like. The decision unit 303 determines as negative in step S10 when the difference between the gradation value of the pixel having the most distant value and the reference value is greater than the predetermined value. The decision unit 303 determines as positive in step S10 when the difference is equal to or less than the predetermined value.

When the decision unit 303 determines in step S10 that the burn-in on the light modulation device 12 is eliminated (YES in step S10), the processing unit 302 ends the execution of the elimination function (step S11). When the decision unit 303 determines as positive in step S10, the processing unit 302 ends the execution of the elimination function even where the total time for which the elimination function is executed is shorter than the first elimination execution time. Thus, the processing unit 302 can reduce the time taken for the execution of the elimination function according to the degree of elimination of burn-in on the light modulation device 12. Therefore, the processing unit 302 can execute the elimination function for a proper time, instead of executing the elimination function for an unnecessarily long time despite the burn-in on the light modulation device 12 being eliminated. Since the time taken for the execution of the elimination function can be reduced, the processing unit 302 can restrain power consumption for the execution of the elimination function.

Particularly, the decision unit 303 carries out the determination in step S10 when a half of the first elimination execution time has passed after the execution of the elimination function is started. Therefore, the decision unit 303 can securely carry out the determination in step S10 before the first elimination execution time passes. Thus, the processing unit 302 can reduce the time taken for the execution of the elimination function to a time shorter than the first elimination execution time decided before the execution of the elimination function, according to the degree of elimination of the burn-in on the light modulation device 12.

Meanwhile, when the decision unit 303 determines in step S10 that the burn-in on the light modulation device 12 is not eliminated (NO in step S10), the decision unit 303 decides a second elimination execution time, based on the picked-up image data picked up by the image pickup unit 52 in step S9 (step S12). The second elimination execution time is decided every time the decision unit 303 determines as negative in step S10. The second elimination execution time is equivalent to the third time period according to the disclosure. The decision unit 303 decides the second elimination execution time in step S12, using the method of the foregoing Example 1 or Example 2. The second elimination execution time is decided after at least a half of the first elimination execution time has passed after the execution of the elimination function is started. Therefore, the second elimination execution time is at least equal to or shorter than the first elimination execution time.

After the decision unit 303 decides the second elimination execution time, the processing unit 302 resumes the execution of the elimination function (step S13).

Next, the processing unit 302 determines whether or not a half of the second elimination execution time decided in step S12 has passed after the execution of the elimination function is resumed (step S14). A half of the second elimination execution time is equivalent to the fourth time period according to the disclosure. When the processing unit 302 determines that a half of the second elimination execution time has not passed (NO in step S14), the processing unit 302 carries out the determination of step S14 again.

Meanwhile, when the processing unit 302 determines that a half of the second elimination execution time has passed (YES in step S14), the processing unit 302 determines whether the total time for which the elimination function is executed is equal to or longer than the first elimination execution time, or not (step S15).

When the processing unit 302 determines that the total time for which the elimination function is executed is shorter than the first elimination execution time (NO in step S15), the processing unit 302 returns the processing to step S7. Then, the projection control unit 301 causes the projection unit 10 to project a projection image for decision again. The decision unit 303 causes the image pickup unit 52 to pick up the projection image for decision again, and determines again whether the burn-in on the light modulation device 12 is eliminated or not, based on the picked-up image data (step S10). When the decision unit 303 determines as positive in step S10, the processing unit 302 carries out the processing of step S11. When the decision unit 303 determines as negative in step S10, the decision unit 303 executes again the processing of step S12 onward.

In this way, the decision unit 303 determines again whether the burn-in on the light modulation device 12 is eliminated or not, when a half of the second elimination execution time has passed and the total time for which the elimination function is executed is shorter than the first elimination execution time. Therefore, the decision unit 303 can carry out the determination in step S10 again, before the first elimination execution time passes. Thus, the processing unit 302 can reduce the time taken for the execution of the elimination function according to the degree of elimination of the burn-in on the light modulation device 12, even after a half of the first elimination execution time has passed.

Meanwhile, the processing unit 302 determines that the total time for which the elimination function is executed is equal to or longer than the first elimination execution time (YES in step S15), the processing unit 302 ends the execution of the elimination function (step S11). In this way, the processing unit 302 ends the execution of the elimination function when the total time for which the elimination function is executed is equal to or longer than the first elimination execution time. Thus, executing the elimination function for a longer time than the first elimination execution time can be restrained.

Referring to FIG. 2, the case where the processing of steps S7 and S8 is executed when a half of the first elimination execution time has passed in step S6 is described. However, the time elapsed to shift to step S7 may be shorter than a half of the first elimination execution time or may be shorter than the first elimination execution time and longer than a half of the first elimination execution time. Similarly, the time elapsed to shift to step S14 may be shorter than a half of the second elimination execution time or may be shorter than the second elimination execution time and longer than a half of the second elimination execution time.

As described above, the projector 1 includes: the projection unit 10 having the light modulation device 12 and projecting a projection image via the light modulation device 12; the image pickup unit 52 picking up the projection image projected by the projection unit 10 and generating picked-up image data; the decision unit 303 deciding the first elimination execution time for which an elimination function to eliminate burn-in on the light modulation device 12 is executed, based on the picked-up image data; and the processing unit 302 executing the elimination function during the first elimination execution time decided by the decision unit 303.

With the projector 1 to which the display device and the method for controlling the display device according to the disclosure are applied, the first elimination execution time can be decided according to the degree of burn-in on the light modulation device 12. Therefore, the elimination function can be executed for a proper time.

The decision unit 303 determines whether the burn-in on the light modulation device 12 is eliminated by the execution of the elimination function or not. When the decision unit 303 determines that the burn-in on the light modulation device 12 is eliminated, the processing unit 302 ends the execution of the elimination function even before the first elimination execution time passes after the execution of the elimination function is started.

In this configuration, the processing unit 302 can reduce the time taken for the execution of the elimination function according to the degree of elimination of burn-in on the light modulation device 12. Therefore, the processing unit 302 can execute the elimination function for a proper time, instead of executing the elimination function for an unnecessarily long time despite the burn-in on the light modulation device 12 being eliminated. Since the time taken for the execution of the elimination function can be reduced, the processing unit 302 can restrain power consumption for the execution of the elimination function.

The decision unit 303 determines whether the burn-in on the light modulation device 12 is eliminated or not, when a half of the first elimination execution time has passed after the execution of the elimination function is started.

In this configuration, the decision unit 303 can securely determine whether the burn-in on the light modulation device 12 is eliminated or not, before the first elimination execution time passes. Therefore, the processing unit 302 can reduce the time taken for the execution of the elimination function to a time shorter than the first elimination execution time decided before the execution of the elimination function, according to the degree of elimination of the burn-in on the light modulation device 12.

The decision unit 303 decides a second elimination execution time based on the picked-up image data, when it is determined that the burn-in on the light modulation device 12 is not eliminated. After deciding the second elimination execution time, the decision unit 303 determines whether the burn-in on the light modulation device 12 is eliminated or not, when a half of the second elimination execution time has passed after the processing unit 302 resumes the execution of the elimination function and the total time for which the elimination function is executed is shorter than the first elimination execution time.

In this configuration, the decision unit 303 determines again whether the burn-in on the light modulation device 12 is eliminated or not, when a half of the second elimination execution time has passed. Therefore, the decision unit 303 can carry out the determination in step S10 again, before the first elimination execution time passes. Thus, the processing unit 302 can reduce the time taken for the execution of the elimination function according to the degree of elimination of the burn-in on the light modulation device 12 even after a half of the first elimination execution time has passed.

The processing unit 302 ends the execution of the elimination function, when the total time for which the elimination function is executed is equal to or longer than the first elimination execution time.

In this configuration, executing the elimination function for a longer time than the first elimination execution time can be restrained and the elimination function can be executed for a proper time.

The processing unit 302 executes the elimination function at a preset timing.

In this configuration, the elimination function is executed at a preset timing. Therefore, the elimination function can be automatically executed for a proper time, saving the time and effort of the user to execute the elimination function.

The foregoing embodiment and modifications are preferred forms of embodiment of the disclosure. However, the disclosure is not limited to these and can be carried out with various modifications without departing from the spirit and scope of the disclosure.

For example, when the method for controlling the projector 1 is implemented using a computer provided in the projector 1 or an external device coupled to the projector 1, the disclosure can be configured in the form of a program executed by the computer in order to implement the method, a recording medium on which this program is recorded in a computer-readable manner, or a transmission medium transmitting this program. The method for controlling the projector 1 is equivalent to the method for controlling the display device according to the disclosure.

The processing stages in the flowchart of FIG. 2 are separated according to the main processing content in order to facilitate understanding of the processing by the control unit 3 of the projector 1. The way the processing stages are separated and the names of the processing stages in the flowchart of FIG. 2 do not limit the disclosure. The processing by the control unit 3 can be separated into more processing stages according to the processing content and can also be separated in such a way that one processing stage includes more processes. The order of processing in the flowchart is not limited to the illustrated example.

Each functional unit of the projector 1 shown in FIG. represents a functional configuration implemented by a collaboration of hardware and software and is not particularly limited to a specific form of installation. Therefore, pieces of hardware corresponding to the individual functional units need not necessarily be installed. A single processor can implement functions of a plurality of functional units by executing a program. Also, a part of the functions implemented by software in the embodiment may be implemented by hardware, and a part of the functions implemented by hardware may be implemented by software.

The display device according to the disclosure is not limited to a projector which projects an image onto the screen SC. The display device includes a self-light-emitting display device of a monitor or liquid crystal television, for example, a liquid crystal display device which displays an image on a liquid crystal display panel or a display device which displays an image on an organic EL panel. The display device according to the disclosure also includes various other display devices.

What is claimed is:

1. A display device comprising:
    a display unit having an electro-optical device and displaying an image via the electro-optical device;
    an image pickup unit picking up the image displayed by the display unit and generating picked-up image data; and
    a processor programmed to act as:
        a decision unit deciding a first time period during which an elimination function to eliminate burn-in on the electro-optical device is to be executed, based on the picked-up image data; and
        a processing unit executing the elimination function during the first time period decided by the decision unit, wherein:
        the decision unit determines whether the burn-in on the electro-optical device is eliminated by the execution of the elimination function or not, and
        when it is determined that the burn-in on the electro-optical device is eliminated, the processing unit ends the execution of the elimination function even before the first time period passes after the execution of the elimination function is started.

2. The display device according to claim 1, wherein the decision unit determines whether the burn-in on the electro-optical device is eliminated or not, when a second time period shorter than the first time period has passed after the processing unit starts the execution of the elimination function.

3. The display device according to claim 2, wherein the decision unit
    causes the image pickup unit to pick up the image and decides a third time period shorter than the first time period, based on the picked-up image data, when it is determined that the burn-in on the electro-optical device is not eliminated, and
    after deciding the third time period, determines whether the burn-in on the electro-optical device is eliminated or not, when a fourth time period shorter than the third time period has passed after the processing unit resumes the execution of the elimination function and a total time of the second time period and the fourth time period is shorter than the first time period.

4. The display device according to claim 3, wherein the processing unit ends the execution of the elimination function, when the fourth time period has passed after the execution of the elimination function is resumed and a total time for which the elimination function is executed is equal to or longer than the first time period.

5. The display device according to claim 1, wherein the processing unit executes the elimination function at a preset timing.

6. A method for controlling a display device which has a display unit having an electro-optical device and displaying an image via the electro-optical device and an image pickup unit picking up the image displayed by the display unit and generating picked-up image data, the method comprising:
    deciding a first time period during which an elimination function to eliminate burn-in on the electro-optical device is to be executed, based on the picked-up image data;
    executing the elimination function during the first time period;
    determining whether the burn-in on the electro-optical device is eliminated by the execution of the elimination function or not, and
    when it is determined that the burn-in on the electro-optical device is eliminated, ending the execution of the elimination function even before the first time period passes after the execution of the elimination function is started.

* * * * *